Patented Oct. 6, 1942

2,297,962

UNITED STATES PATENT OFFICE 2,297,962

CANNING METHOD

Lloyd B. Jensen and Levi Scott Paddock, Chicago, Ill., assignors to Industrial Patents Corporation, Chicago, Ill., a corporation of Delaware No Drawing. Application December 31, 1938, Serial No. 248,904

1 Claim. (Cl. 9—187)

This invention relates to an improved method for canning meat, such as ham, spiced ham, luncheon meat, loin pork, and the like.

One of the objects of this invention is to improve the keeping qualities of canned meat products.

Another object of this invention is to provide a method of sterilizing canned meat products.

Other objects and advantages of our invention will become apparent from the description and claim which follow.

We have found that canned meats, such as ham, spiced ham, luncheon meat and the like, when cooked after being placed in cans to temperatures which will not render the meat unpalatable, do not possess high keeping qualities. In preparing canned meat, the meat is properly cured or is mixed with the proper seasoning materials and is placed in cans which are then sealed. After sealing, the product is heated to a temperature between 60 degrees C. and 100 degrees C. in an attempt to sterilize the meat. It has been found that such canned meat will form sufficient gas to swell the can upon incubation, that is, upon being held at a temperature of about 37 degrees C. for a period of about 30 days.

The formation of gas is due to the simultaneous action of certain members of the genus bacillus on the nitrate, nitrite, sugar and meat present. These bacteria are aerobic spore bearing rods which are resistant to heat, for example, boiling water at 100 degrees C. for from one to twelve minutes, and dry heat at about 140 degrees C. for three hours. The protoplasm is considerably dehydrated and is not readily coagulated, the coagulation of the protoplasm being essential to destroy the organism.

We have discovered that the microbes may be destroyed by a short exposure to heat if the spore is permitted to germinate by incubation. We have discovered that canned meat may be rendered sterile and the production of gas by bacterial action may be eliminated by discontinuous or intermittent sterilization at comparatively low temperatures. For example, sterilization may be effected by intermittently heating the product to a temperature between 60 degrees C. and 100 degrees C. for periods of from one-half hour to three hours. Between each heating period the product is permitted to cool to an incubating temperature, for example, to about 37 degrees C. and is held at this temperature for from fifteen to twenty-four hours.

The intermittent or discontinuous sterilization or heat treatment destroys those bacteria which are in vegetative form in the media or the food. The first heat treatment results in the destruction of the vegetative bacteria which possess feeble heat resisting properties, but will not destroy the spores. After the first heat treatment, the canned product is held at incubating temperatures, for example, at a temperature of about 37 degrees C., for a period of from fifteen to twenty-four hours to permit the spores to develop into vegetative bacteria. The second heat treatment will destroy the vegetative bacteria resulting from the spores which were not destroyed or affected during the first heat treatment. The product may then be held at incubating temperatures for a period of from fifteen to twenty-four hours followed by a third heat treatment which will destroy the bacteria which have not been destroyed by the previous heat treatments. The number of heat treatments required for satisfactory sterilization depends upon the individual product. In most cases, two heat treatments are sufficient; in some cases, however, four heat treatments are necessary to insure the complete destruction of the undesirable bacteria.

Our invention permits a complete sterilization of canned meat products at low temperatures which will not affect the flavor or other desired properties of the meat.

The usual heating or cooking treatment which has been employed to effect a sterilization of the canned meat results in large losses of meat due to shrinkage. We have found that our method substantially eliminates the shrinkage losses and that the yields of meat treated by our intermittent sterilization method are wholly unexpected and unprecedented. Canned meat processed in accordance with our invention has keeping qualities superior to those of canned meat products of prior methods.

We claim:

The method of treating canned meat which comprises heating the canned meat to a temperature between 60 degrees C. and 100 degrees C. for a period of from one-half hour to three hours, cooling the meat to a temperature of about 37 degrees C. and maintaining the meat at such temperature for a period of from fifteen hours to twenty-four hours, and thereafter heating the meat to a temperature between 60 degrees C. and 100 degrees C. for a period of one-half hour to three hours.

LLOYD B. JENSEN.
LEVI SCOTT PADDOCK.